United States Patent
Barton et al.

(10) Patent No.: US 7,665,137 B1
(45) Date of Patent: Feb. 16, 2010

(54) SYSTEM, METHOD AND COMPUTER PROGRAM PRODUCT FOR ANTI-VIRUS SCANNING IN A STORAGE SUBSYSTEM

(75) Inventors: Chris A. Barton, Buckingham (GB);
James M. Vignoles, Aylesbury (GB);
James W. Lawrence, Aylesbury (GB)

(73) Assignee: McAfee, Inc., Santa Clara, CA (US)

( * ) Notice: Subject to any disclaimer, the term of this patent is extended or adjusted under 35 U.S.C. 154(b) by 2132 days.

(21) Appl. No.: 09/916,600

(22) Filed: Jul. 26, 2001

(51) Int. Cl.
*G01F 11/00* (2006.01)
*G06F 12/14* (2006.01)
*G08B 29/00* (2006.01)

(52) U.S. Cl. .......................... 726/24; 726/30; 713/188

(58) Field of Classification Search ................. 713/200, 713/188, 193; 726/24, 30
See application file for complete search history.

(56) References Cited

U.S. PATENT DOCUMENTS

| | | | | |
|---|---|---|---|---|
| 5,696,822 A * | 12/1997 | Nachenberg | ............... | 713/200 |
| 5,809,138 A | 9/1998 | Netiv | ............... | 380/4 |
| 5,918,008 A * | 6/1999 | Togawa et al. | ............... | 713/200 |
| 5,964,889 A * | 10/1999 | Nachenberg | ............... | 714/25 |
| 5,999,723 A * | 12/1999 | Nachenberg | ............... | 703/22 |
| 6,011,537 A | 1/2000 | Slotznick | ............... | 715/733 |
| 6,272,533 B1 * | 8/2001 | Browne | ............... | 709/213 |
| 6,347,375 B1 * | 2/2002 | Reinert et al. | ............... | 713/200 |
| 6,735,700 B1 * | 5/2004 | Flint et al. | ............... | 713/200 |
| 6,748,534 B1 * | 6/2004 | Gryaznov et al. | ............... | 713/188 |
| 6,763,466 B1 * | 7/2004 | Glover | ............... | 713/200 |
| 7,010,807 B1 * | 3/2006 | Yanovsky | ............... | 726/24 |
| 2001/0007120 A1 * | 7/2001 | Makita | ............... | 711/112 |
| 2002/0194212 A1 * | 12/2002 | Grupe | ............... | 707/500 |
| 2002/0199116 A1 * | 12/2002 | Hoene et al. | ............... | 713/201 |
| 2003/0191957 A1 * | 10/2003 | Hypponen et al. | ............... | 713/200 |

FOREIGN PATENT DOCUMENTS

WO 98/45778 10/1998

OTHER PUBLICATIONS

Office Action Summary from U.S. Appl. No. 09/916,929 which was mailed on Jan. 13, 2005.
Notice of Allowance from U.S. Appl. No. 09/916,929 which was mailed on Nov. 2, 2009.

* cited by examiner

*Primary Examiner*—Michael Pyzocha
(74) *Attorney, Agent, or Firm*—Zilka-Kotab, PC

(57) ABSTRACT

A system, method and computer program product are provided for scanning data. Initially, a request is received from a central processing unit for reading data saved in storage. The requested data is then scanned. If malicious code is not found in the data during the scanning, the data is transmitted from the storage to the central processing unit. In a similar manner, a request is received for data to be written in storage. In response to the request, the requested data is scanned. If malicious code is not found in the data during the scanning, data is written to the storage.

37 Claims, 5 Drawing Sheets

SYSTEM, METHOD AND COMPUTER PROGRAM PRODUCT FOR ANTI-VIRUS SCANNING IN A STORAGE SUBSYSTEM

FIELD OF THE INVENTION

The present invention relates to virus scanning methods, and more particularly to scanning data passing to and from storage for viruses and/or hostile content.

BACKGROUND OF THE INVENTION

A computer virus is a parasitic computer executable code, that is capable of replicating and attaching itself to programs by writing itself on a storage medium. As of today, there are thousands of known viruses and all of them either attach themselves to files or to system booting programs of a hard disk or of a floppy diskette. Of the known viruses, the great majority are file infectors (they attach themselves to program files) and just one to two hundred are of the boot infector type. Thus, the major problem is to protect against file infecting viruses. Known exemplary types of such viruses include worms and Trojan horses.

A program may become infected by being exposed to an infected environment (a virus is present in the computer's memory), while attempting to execute the program. What actually happens is that the virus code writes a copy thereof onto the storage medium, which is then appended to the host program code.

There are several ways to protect computer programs from virus infection. A simple and passive protection method involves using "read-only" media such as CD-ROM (Compact Disk-Read Only Memory), or floppy disks that are write-protected. Many computer programs such as the circulated MS-DOS, Windows operating systems, are distributed on write-disabled floppy disks or CD-ROMs.

Unfortunately, not all programs can feasibly be protected utilizing read-only memory. This is especially the case in read/writable memory subsystems of computers which typically include hard drives and the like. Accordingly, there is thus a need for a memory scanning system capable of combating viruses and other hostile content in memory subsystems.

Still yet, prior art systems do not address the fact that virus and/or content scanning inherently use up a large proportion of system resources in the form of cycles in the central processing unit.

DISCLOSURE OF THE INVENTION

A system, method and computer program product are provided for scanning data. Initially, a request is received from a central processing unit for reading data saved in storage. The requested data is then scanned. If malicious code is not found in the data during the scanning, the data is transmitted from the storage to the central processing unit. In a similar manner, a request is received for data to be written in storage. In response to the request, the requested data is scanned. If malicious code is not found in the data during the scanning, data is written to the storage.

In one embodiment, the storage may include a hard drive, compact disc-read only memory (CD-ROM), and/or a floppy disk. As an option, the storage may be accessible via a network. Further, the scanning may include virus and/or content scanning.

In another embodiment, the scanning may be performed by a scanning module located in a storage subsystem, thus offloading the central processing unit. Such storage subsystem may be coupled to a storage driver which is, in turn, coupled to the central processing unit. The scanning module may include software and/or hardware.

As an option, the user may be allowed to disable the scanning module. Further, the data may be precluded from being read and/or written upon the disabling of the scanning module. Moreover, an event may be executed based on results of the scanning. In one embodiment, the event may include an alert.

DESCRIPTION OF THE PREFERRED EMBODIMENTS

Figure 1:
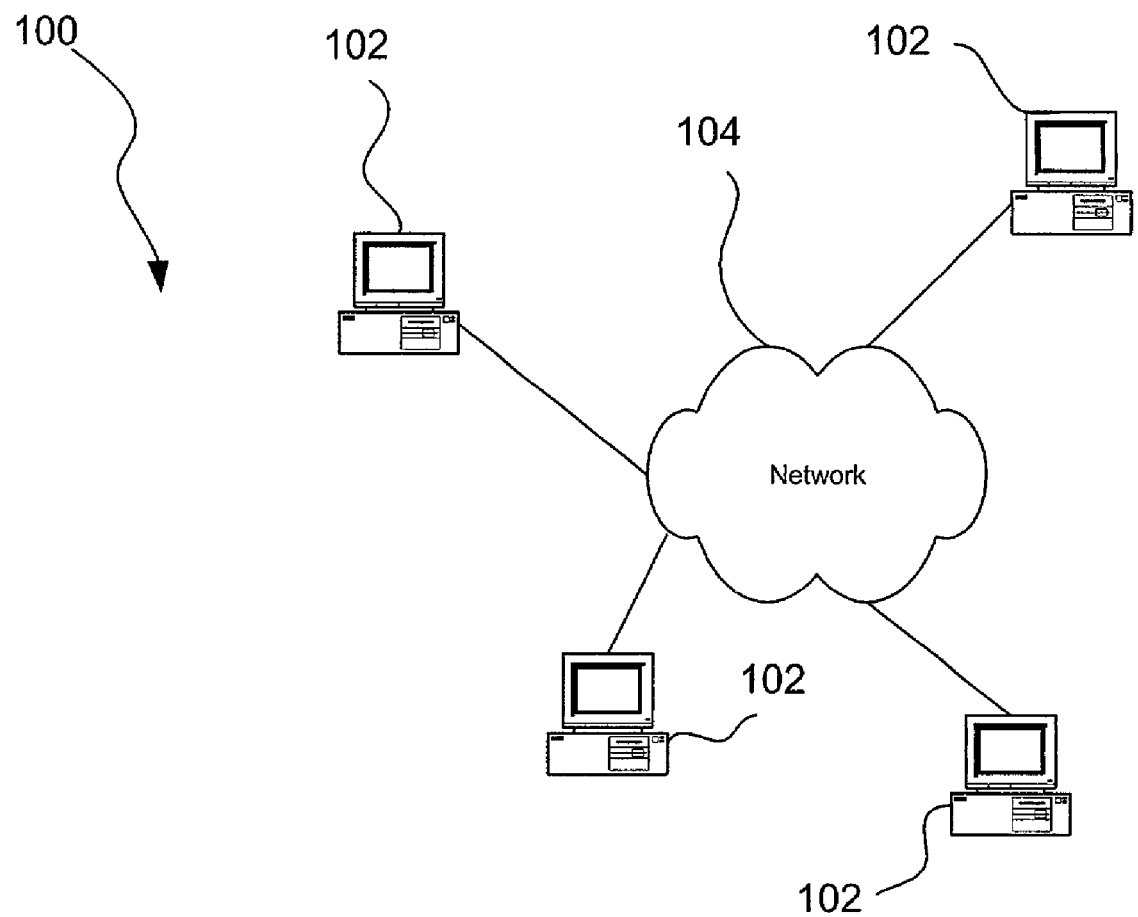
FIG. 1 illustrates a network architecture, in accordance with one embodiment.

FIG. 1 illustrates a network architecture 100, in accordance with one embodiment. As shown, a plurality of computers 102 is provided which are each coupled to a network 104. It should be noted that various other networks may also be included. In the context of the present network architecture 100, the network 104 may take any form including, but not limited to a local area network (LAN), a wide area network (WAN) such as the Internet, etc. Further, the computers 102 may include a web server, desktop computer, lap-top computer, hand-held computer, printer or any other type of hardware/software.

Figure 2:
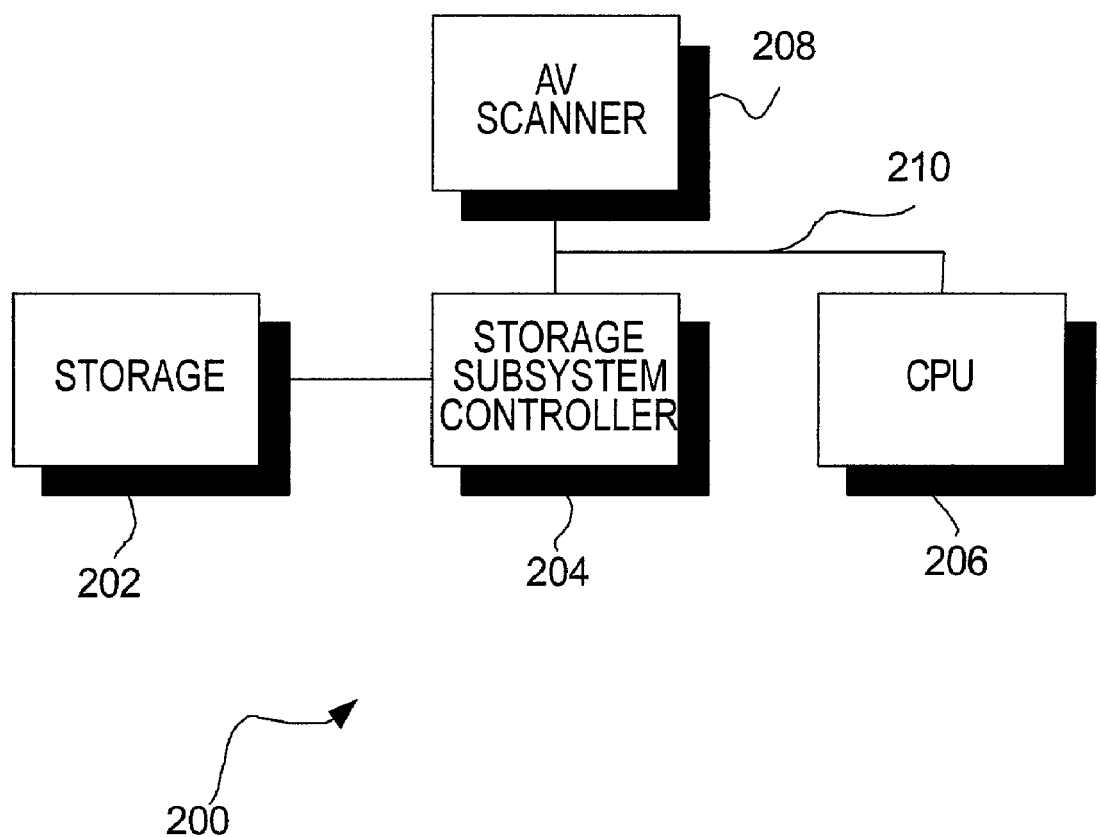
FIG. 2 illustrates an exemplary computer architecture of one of the computers of FIG. 1, in accordance with one embodiment.

FIG. 2 illustrates an exemplary computer architecture 200 of one of the computers 102 of FIG. 1, in accordance with one embodiment. It should be noted that the computer architecture 200 of FIG. 2 may be networked to other computers 102, or include a stand-alone device per the desires of the user.

As shown, included is a storage 202 for saving data therein. In one embodiment, the storage 202 may include a hard drive, compact disc-read only memory (CD-ROM), a floppy disk, and/or any other type of device capable of storing data. Coupled to the storage 202 is a storage subsystem controller 204 for controlling access, i.e. read, writes, etc., to the storage 202. It should be noted that the storage subsystem controller 204 may take any form including hardware, software or any other type of logic.

A central processing unit 206 is coupled to the storage subsystem controller 204 for issuing read requests to read the data saved in the storage 202 for processing purposes. The central processing unit 204 further issues write requests for writing data to the storage 202.

A scanning module 208 is coupled to the central processing unit 206 and the storage subsystem controller 204. In one embodiment, the scanning module 208 is coupled to the storage subsystem controller 204 and the central processing unit 206 via a bus 210. As an option, the scanning module 208 may be directly coupled to the storage subsystem controller 204.

In such embodiment, a plug-in (not shown) may be included for interfacing with the storage subsystem controller 204. In still another embodiment, the scanning module 208 may be integral with the storage 202 and/or the storage subsystem controller 204. Still yet, the storage 202 may be accessible via the network 104.

In use, the scanning module 208 is adapted for receiving the requests (or corresponding requests) from the central processing unit 206, and scanning the data in response to the requests. For example, the scanning module 208 may be capable of virus and/or content scanning for malicious code. In particular, such virus scanning may include a search for viruses, worms, and Trojan horses. Further, the content scanning may serve to detect harassing or pornographic content, junk e-mails, misinformation (virus hoaxes), etc.

Based on results of such scanning by the scanning module 208, the central processing unit 206 is conditionally allowed to read the data saved in the storage 202 and write data to the storage 202. In particular, access to the storage 202 may be precluded if any malicious code is found in the data to be read or written. Further, various alerts may be generated based on the results of the scanning.

Figure 3:
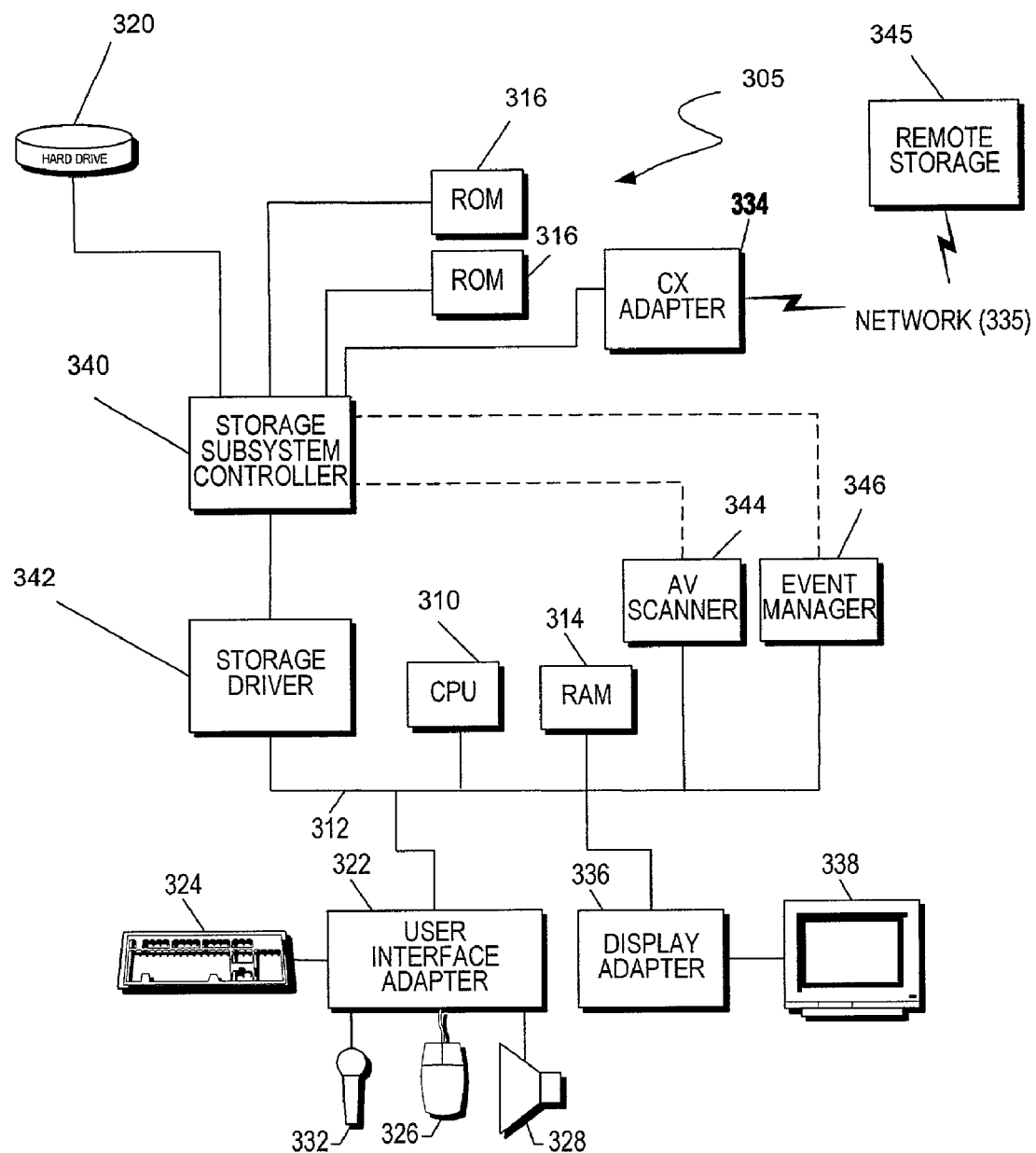
FIG. 3 shows a more comprehensive hardware environment that may be employed in the context of one embodiment.

FIG. 3 shows a more comprehensive hardware environment 300 that may be employed in the context of one embodiment. Such figure illustrates a typical hardware configuration of a workstation in accordance with a preferred embodiment having a central processing unit 310, such as a microprocessor, and a number of other units interconnected via a system bus 312. As mentioned earlier, the central processing unit 310 is adapted for issuing read requests for reading the data saved in storage 305 and further issuing write requests for writing data to the storage 305 for processing purposes.

The central processing unit 310 may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

The workstation shown in FIG. 3 further includes a Random Access Memory (RAM) 314, Read Only Memory (ROM) 316, a user interface adapter 322 for connecting a keyboard 324, a mouse 326, a speaker 328, a microphone 332, and/or other user interface devices such as a touch screen (not shown) to the bus 312, communication adapter 334 for connecting the workstation to a communication network 335 (e.g., a data processing network) and a display adapter 336 for connecting the bus 312 to a display device 338. As an option, a remote storage 345 may be accessible via the network 335, and may operate in a manner similar to that of the local storage 305.

Coupled to the various storage 305 (i.e. disk storage unit 320, ROM 316, remote storage 345, etc.) is a storage subsystem controller 340 for controlling access, i.e. read, writes, etc., to the storage 305. As mentioned earlier, the storage subsystem controller 340 may take any form including hardware, software or any other type of logic. For example, the storage subsystem controller 340 may include a Redundant Arrays of Inexpensive Disks (RAID) controller or the like.

Associated therewith is a storage driver 342 coupled between the bus 312 and the storage subsystem controller 340. In use, the storage driver 342 interfaces with the operating system running on the central processing unit 310 for communicating the read and write requests to the storage subsystem controller 340.

A scanning module 344 is coupled to the central processing unit 310 and the storage subsystem controller 340. In use, the scanning module 344 is capable of virus and/or content scanning for detecting malicious code.

In one embodiment, the scanning module 344 is coupled to the storage subsystem controller 340 and the central processing unit 310 via the bus 312. As mentioned earlier, the scanning module 344 may be directly coupled to the storage subsystem controller 340. Note the phantom connection shown in FIG. 3. In such embodiment, a plug-in (not shown) may be included for interfacing with the storage subsystem controller 340. In still another embodiment, the scanning module 340 may be integral with the storage 305 and/or the storage subsystem controller 340.

Further included in the present embodiment is an event manager module 346 coupled to the scanning module 344 and the central processing unit 310 via the bus 312. It should be understood that the event manager module 346 may be directly coupled to the storage subsystem controller 340 and/or the scanning module 344, or even be integral with the scanning module 344. Note the phantom connection shown in FIG. 3.

In use, the event manager module 346 is adapted for receiving results of the scanning from the scanning module 344. The event manager module 346 is further adapted to execute an event based on the results of the scanning. In one embodiment, such events may include conditionally-precluding the central processing unit 310 from reading the data saved in the storage 305 and writing data to the storage 305 if any malicious code is found in the data to be read or written. Further, various alerts may be sent based on the results of the scanning. Of course, the event may be selected based on any desired policy. As an option, the event manager module 346 may include Alert Manager™ or ePolicy Orchestrator™ manufactured by NETWORK ASSOCIATES.

Figure 4:
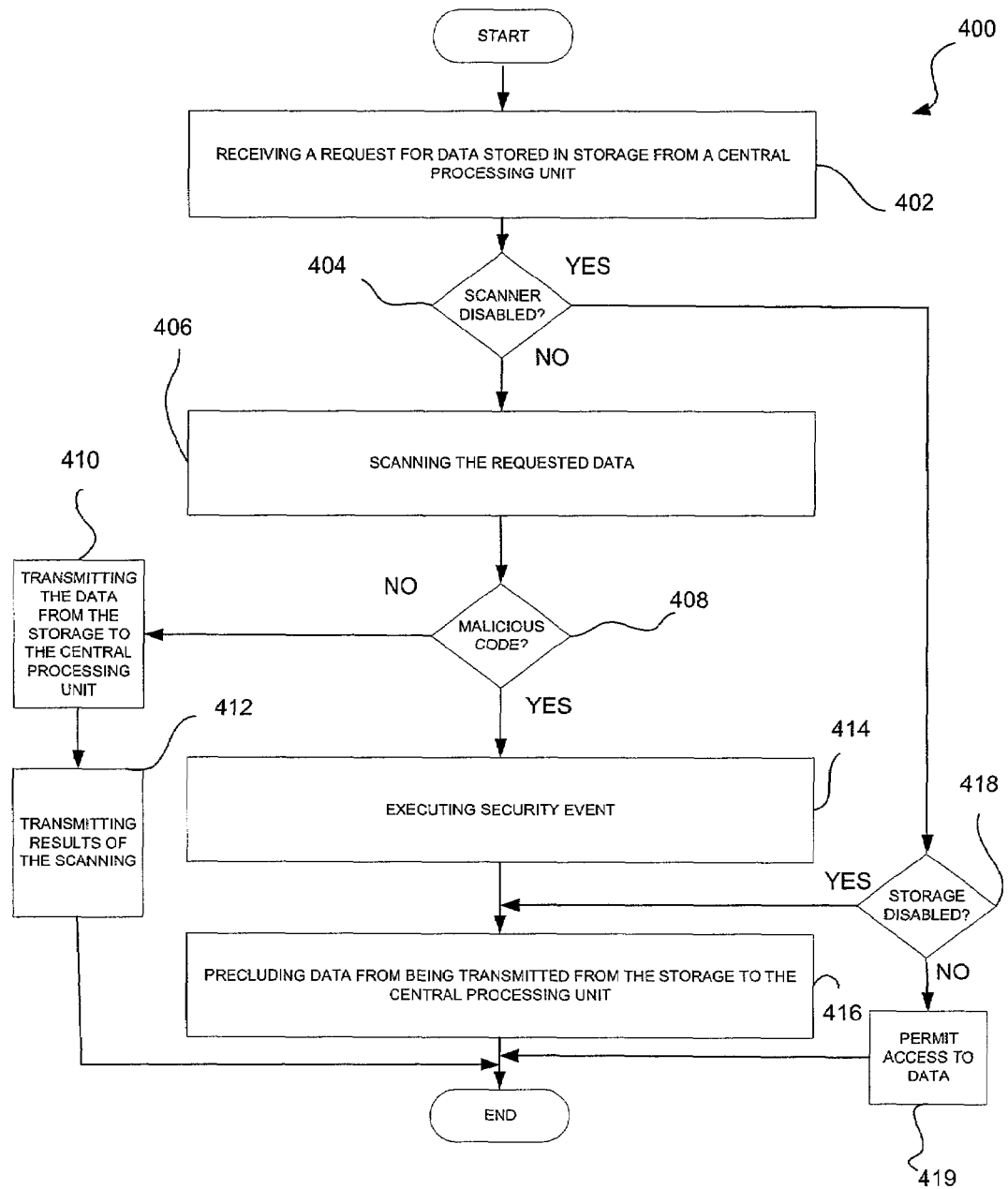
FIG. 4 illustrates a method for scanning data to be read from storage in the context of one of the embodiments set forth hereinabove.

FIG. 4 illustrates a method 400 for scanning data to be read from storage in the context of one of the embodiments set forth hereinabove, or any other desired architecture. Initially, in operation 402, a request is received from a central processing unit. Such request is for reading data saved in storage. It should be noted that such request may be made in response to a user request to access data, an automatic application program request to access data, or any other type of situation that requires that data be accessed.

It is then determined whether the scanning module is disabled in decision 404. Disabling of the scanning module may occur by manual user intervention, remote administrator intervention, or the like. As will become apparent hereinafter, the storage itself may also be selectively disabled. If it is determined that the scanning module is not disabled in decision 404, the requested data is then scanned in operation 406 using the scanning module before any access is allowed thereto.

In one embodiment, this may be accomplished by the scanning module intercepting the request from the central processing unit before it can be acted upon by the memory subsystem controller. Thereafter, the central processing unit may be stalled while the scanning module requests the storage subsystem controller for access to the data for scanning purposes. As an option, this may be accomplished via a storage driver.

It is then determined in decision 408 as to whether malicious code was found during the scanning of operation 406. If malicious code is not found in the data during the scanning, the data is transmitted from the storage to the central processing unit per the original request. See operation 410. Furthermore, results of the scanning may be transmitted to an I/O device or a network administrator for alerting a user of the status of the scanning. See operation 412.

If, however, malicious code is found in the data during the scanning in decision 408, a security event is executed in operation 414. Such security event may take any form. For example, an alert may be transmitted to an I/O device or a network administrator for alerting a user of the malicious code. Further, a quarantine operation may be executed to isolate the data infected with the malicious code. Still yet, a well known repair routine may be initiated to remove the malicious code. In such embodiment where the data is repaired, the data may be transmitted from the storage to the central processing unit per the original request.

In one embodiment, the scanning module itself may issue the security event in response to the detection of malicious code. However, in an embodiment including the aforementioned event manager module, the scanning module may simply be responsible for detecting the malicious code and sending a corresponding indication to the event manager module. In such embodiment, the event manager is responsible for executing the appropriate security event in response to the indication received from the scanning module.

Unless the repair routine is included as a security event, the data is precluded from being transmitted to the central processing unit in operation 416 in order to prevent the proliferation of the virus. By this design, a protection mechanism is afforded to prevent the computer from being completely infected with the malicious code.

As mentioned earlier, the storage itself may also be selectively disabled. If the storage is disabled in decision 418 along with the scanner (see decision 404), the data is precluded from being read by the central processing unit. If, however, the storage is not determined to be disabled in decision 418, the data may be accessed in the storage, despite the disabling of the scanning module. See operation 419. By this design, a user can selectively tighten security by preventing use of the storage without the scanner being enabled.

Figure 5:
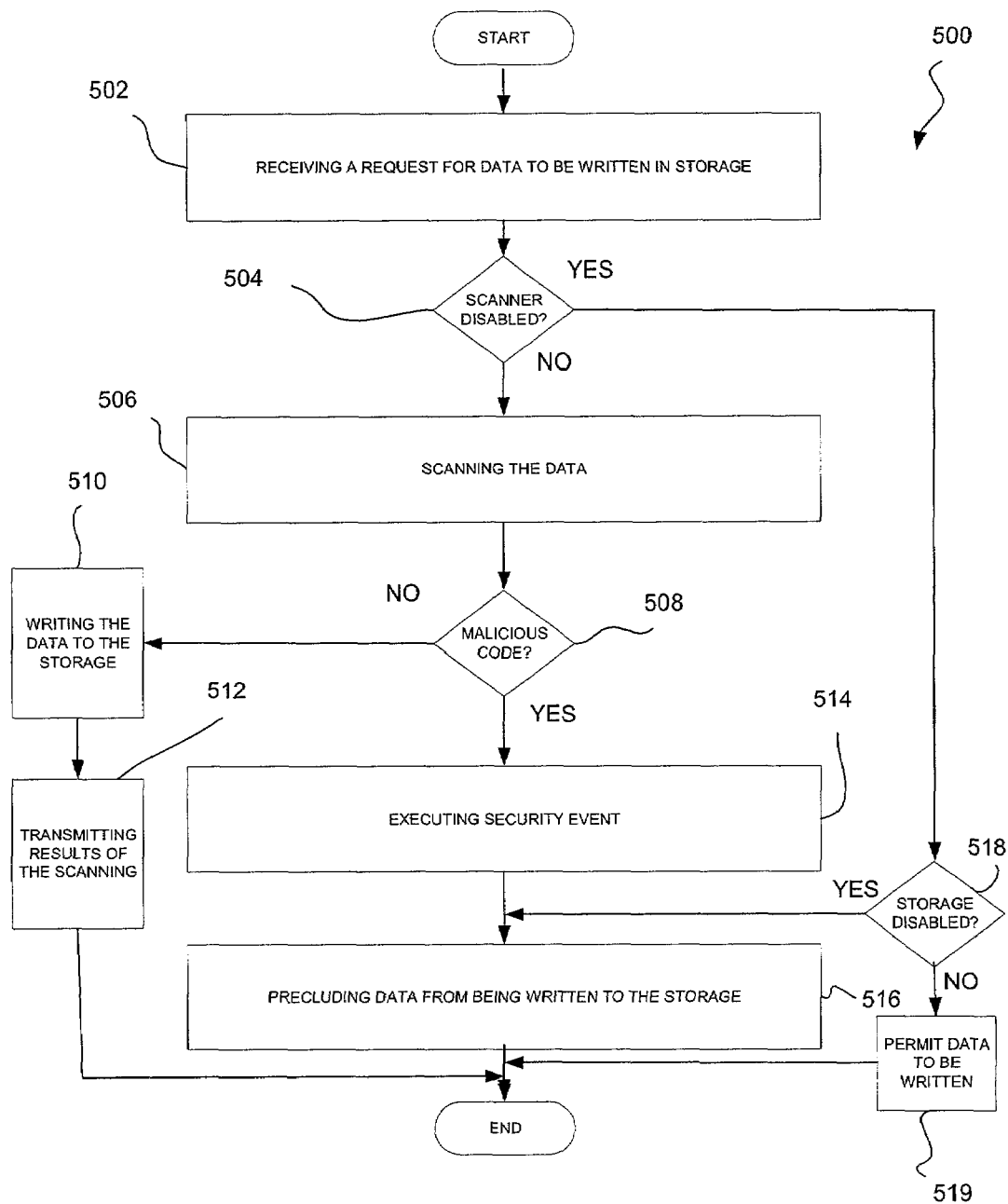
FIG. 5 illustrates a method for scanning data to be written to storage in the context of one of the embodiments set forth hereinabove.

FIG. 5 illustrates a method 500 for scanning data to be written to storage in the context of one of the embodiments set forth hereinabove, or any other desired architecture. Initially, in operation 502, a request is received from a central processing unit. Such request is for writing data to the storage.

It is then determined whether the scanning module is disabled in decision 504. Disabling of the scanning module may occur by manual user intervention, remote administrator intervention, or the like. If it is determined that the scanning module is not disabled in decision 504, the requested data is then scanned in operation 506 using the scanning module before it is written to the storage.

In one embodiment, this may be accomplished by the scanning module intercepting the request from the central processing unit before it can be acted upon by the memory subsystem controller. Thereafter, the central processing unit may be stalled while the scanning module accesses the data for scanning purposes. If, for example, the data is received from a remote source, the data may be stored in isolated RAM or the like for scanning before being written to the conventional storage.

It is then determined in decision 508 as to whether malicious code was found during the scanning of operation 506. If malicious code is not found in the data during the scanning, the data is written to the storage per the original request. See operation 510. Furthermore, results of the scanning may be transmitted to an I/O device or a network administrator for alerting a user of the status of the scanning. See operation 512.

If, however, malicious code is found in the data during the scanning in decision 508, a security event is executed in operation 514. As mentioned earlier, such security event may take any form. For example, an alert may be transmitted to an I/O device or a network administrator for alerting a user of the malicious code. Further, a quarantine operation may be executed to isolate the data in isolated memory. Still yet, a well known repair routine may be initiated to remove the malicious code. In such embodiment, the data may be written to the storage per the original request received from the central processing unit.

In one embodiment, the scanning module itself may issue the security event in response to the detection of malicious code. However, in an embodiment including the aforementioned event manager module, the event manager may be responsible for executing the appropriate security event in response to the indication received from the scanning module.

Unless the repair routine is included as a security event, the data is precluded from being written to the storage in operation 516 in order to prevent the proliferation of the virus. By this design, a protection mechanism is afforded to prevent the computer from being completely infected with the malicious code.

As mentioned earlier, the storage itself may also be selectively disabled. If the storage is disabled in decision 518, the data is precluded from being written to the storage. If, however, the storage is not determined to be disabled in decision 518, the data may be written to the storage, despite the disabling of the scanning module. See operation 519.

Virus and content scanning inherently uses up a large proportion of system resources, especially in servers. By putting scanning processing into a storage subsystem such as storage subsystem controllers or other storage devices, system resources are freed up for other tasks.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for scanning data read from storage, comprising:
   receiving a request for data saved in storage from a central processing unit;
   scanning the requested data for malicious code; and
   transmitting the data from the storage to the central processing unit if malicious code is not found in the data during the scanning;
   wherein the scanning is performed by a scanning module coupled to a storage subsystem controller;
   wherein a user is allowed to disable the scanning module, and data is precluded from being transmitted from the storage to the central processing unit upon the disabling of the scanning module.

2. The method as recited in claim 1, wherein the storage includes at least one of a hard drive, compact disc-read only memory (CD-ROM), and a floppy disk.

3. The method as recited in claim 1, wherein the storage subsystem controller is coupled to a storage driver which is coupled to the central processing unit, where the storage driver is coupled between the storage subsystem controller and the central processing unit, so that the storage subsystem controller and the central processing unit must communicate therethrough.

4. The method as recited in claim 1, wherein the storage subsystem controller is coupled to the storage.

5. The method as recited in claim 1, wherein the scanning module includes software.

6. The method as recited in claim 1, wherein the scanning module includes hardware.

7. The method as recited in claim 1, and further comprising executing an event based on results of the scanning.

8. The method as recited in claim 7, wherein the event includes an alert.

9. The method as recited in claim 7, and further comprising disabling the scanning module in response to the event.

10. The method as recited in claim 9, wherein data is precluded from being transmitted from the storage to the central processing unit upon the disabling of the scanning module.

11. The method as recited in claim 1, wherein the scanning includes content scanning.

12. The method as recited in claim 1, wherein the scanning includes virus scanning.

13. The method as recited in claim 1, wherein the storage is accessible via a network.

14. The method as recited in claim 1, wherein the user includes a remote administrator.

15. The method as recited in claim 1, wherein the user is allowed to disable the storage, and the data is precluded from being transmitted to the storage from the central processing unit upon the disabling of the storage.

16. The method as recited in claim 15, wherein it is determined whether the storage is disabled only after determining whether the scanning module is disabled.

17. The method as recited in claim 16, wherein the disabling and enabling of the storage and the scanning module provides increased functionality in conditionally precluding transmission of the data to the storage from the central processing unit.

18. A computer program product embodied on a tangible computer readable medium, comprising:
    computer code for receiving a request for data saved in storage from a central processing unit;
    computer code for scanning the requested data for malicious code; and
    computer code for transmitting the data from the storage to the central processing unit if malicious code is not found in the data during the scanning;
    wherein the scanning is performed by a scanning module coupled to a storage subsystem controller;
    wherein a user is allowed to disable the scanning module, and the computer program product is operable such that data is precluded from being transmitted from the storage to the central processing unit upon the disabling of the scanning module.

19. The computer program product as recited in claim 18, wherein the storage includes at least one of a hard drive, compact disc-read only memory (CD-ROM), and a floppy disk.

20. The computer program product as recited in claim 18, wherein the storage subsystem controller is coupled to a storage driver which is coupled to the central processing unit, where the storage driver is coupled between the storage subsystem controller and the central processing unit, so that the storage subsystem controller and the central processing unit must communicate therethrough.

21. The computer program product as recited in claim 18, wherein the storage subsystem controller is coupled to the storage.

22. The computer program product as recited in claim 18, wherein the scanning module includes software.

23. The computer program product as recited in claim 18, wherein the scanning module includes hardware.

24. The computer program product as recited in claim 18, and further comprising computer code for executing an event based on results of the scanning.

25. The computer program product as recited in claim 24, wherein the event includes an alert.

26. The computer program product as recited in claim 24, and further comprising computer code for disabling the scanning module in response to the event.

27. The computer program product as recited in claim 26, wherein data is precluded from being transmitted from the storage to the central processing unit upon the disabling of the scanning module.

28. The computer program product as recited in claim 18, wherein the scanning includes content scanning.

29. The computer program product as recited in claim 18, wherein the scanning includes virus scanning.

30. The computer program product as recited in claim 18, wherein the storage is accessible via a network.

31. A method for scanning data written to storage, comprising:
    receiving a request for data to be written in storage, the request being received from a central processing unit;
    scanning the data for malicious code; and
    writing the data to the storage if malicious code is not found in the data during the scanning;
    wherein the scanning is performed by a scanning module coupled to a storage subsystem controller;
    wherein a user is allowed to disable the scanning module, and data is precluded from being transmitted to the storage from the central processing unit upon the disabling of the scanning module.

32. A computer program product embodied on a tangible computer readable medium, comprising:
    computer code for receiving a request for data to be written in storage, the request being received from a central processing unit;
    computer code for scanning the data for malicious code; and
    computer code for writing the data to the storage if malicious code is not found in the data during the scanning;
    wherein the scanning is performed by a scanning module coupled to a storage subsystem controller;
    wherein a user is allowed to disable the scanning module, and the computer program product is operable such that data is precluded from being transmitted to the storage from the central processing unit upon the disabling of the scanning module.

33. A system, comprising:
    storage for saving data therein;
    a storage subsystem controller coupled to the storage for controlling access to the data saved therein;
    a central processing unit coupled to the storage subsystem controller for issuing read requests for reading the data saved therein for processing purposes, and write requests for writing data to the storage;
    a scanning module coupled to the central processing unit and the storage subsystem controller, the scanning module adapted for identifying the requests from the central processing unit, and scanning the data for malicious code in response to the requests; and an event manager module coupled to the scanning module and the central processing unit, the event manager module adapted for receiving results of the scanning from the scanning module, the event manager module adapted to execute an event based on the results of the scanning;

wherein the central processing unit is conditionally allowed to read the data saved in the storage and write data to the storage based on the results of the scanning;

wherein a user is allowed to disable the scanning module, and the system is operable such that data is precluded from being transmitted between the storage and the central processing unit upon the disabling of the scanning module.

34. The system as recited in claim 33, wherein the scanning module is coupled to the storage subsystem controller via a bus.

35. The system as recited in claim 33, wherein the scanning module is directly coupled to the storage subsystem controller.

36. The system as recited in claim 33, wherein the scanning module is coupled to the storage subsystem controller via a storage driver, where the storage driver is coupled between the storage subsystem controller and the central processing unit, so that the storage subsystem controller and the central processing unit must communicate therethrough.

37. A system, comprising:
means for saving data therein;
means for controlling access to the data saved therein;
means for issuing read requests for reading the data saved therein for processing purposes and write requests for writing data to the storage;
means for identifying the requests from the central processing unit, and scanning the data for malicious code in response to the requests; and
means for receiving results of the scanning from the scanning module, the event manager module adapted to execute an event based on the results of the scanning;
wherein the central processing unit is conditionally allowed to read the data saved in the storage and write data to the storage based on the results of the scanning;
wherein a user is allowed to disable the scanning module, and the system is operable such that data is precluded from being transmitted between the storage and the central processing unit upon the disabling of the scanning module.

* * * * *